(12) United States Patent
Shin et al.

(10) Patent No.: US 8,953,127 B2
(45) Date of Patent: Feb. 10, 2015

(54) LENS PANEL, METHOD FOR MANUFACTURING LENS PANEL, AND DISPLAY APPARATUS HAVING LENS PANEL

(75) Inventors: Yong-Hwan Shin, Yongin-si (KR); Hoi-Lim Kim, Seoul (KR)

(73) Assignee: Samsung Display Co., Ltd., Yongin (KR)

(*) Notice: Subject to any disclaimer, the term of this patent is extended or adjusted under 35 U.S.C. 154(b) by 201 days.

(21) Appl. No.: 13/406,184

(22) Filed: Feb. 27, 2012

(65) Prior Publication Data
US 2012/0314143 A1 Dec. 13, 2012

(30) Foreign Application Priority Data
Jun. 7, 2011 (KR) .................. 10-2011-0054536

(51) Int. Cl.
G02F 1/1337 (2006.01)
B32B 37/02 (2006.01)
B32B 38/18 (2006.01)

(52) U.S. Cl.
CPC .......... B32B 37/02 (2013.01); G02F 1/133753 (2013.01); G02F 1/133788 (2013.01); B32B 38/1833 (2013.01); B32B 2310/0831 (2013.01); B32B 2457/202 (2013.01); G02F 2001/133757 (2013.01); G02F 2203/24 (2013.01); G02F 2203/28 (2013.01)
USPC .............. 349/123; 349/15; 349/200; 349/129

(58) Field of Classification Search
CPC ........................................................ G03F 7/20
USPC ..................................... 349/15, 123, 200, 129
See application file for complete search history.

(56) References Cited

U.S. PATENT DOCUMENTS

| 6,268,897 | B1 * | 7/2001 | Kim et al. ..................... 349/124 |
| 7,375,784 | B2 * | 5/2008 | Smith et al. ................... 349/129 |
| 8,120,737 | B2 * | 2/2012 | Yoshida et al. ............... 349/129 |
| 2004/0201806 | A1 * | 10/2004 | Choo et al. .................... 349/129 |
| 2006/0146243 | A1 * | 7/2006 | Nakanishi et al. ............ 349/139 |
| 2007/0030429 | A1 * | 2/2007 | Kim et al. ..................... 349/129 |
| 2007/0195410 | A1 * | 8/2007 | Yun et al. ...................... 359/464 |
| 2010/0050813 | A1 * | 3/2010 | Nakakado et al. .............. 75/640 |
| 2010/0060813 | A1 * | 3/2010 | Kawashima et al. .......... 349/39 |
| 2010/0157223 | A1 * | 6/2010 | Shin et al. ..................... 349/129 |
| 2011/0228181 | A1 * | 9/2011 | Jeong et al. ..................... 349/15 |

FOREIGN PATENT DOCUMENTS

| JP | 2005-134663 | 5/2005 |
| KR | 10-2006-0002406 | * 1/2006 ............. G02F 1/137 |
| KR | 10-2007-0089023 | 8/2007 |

* cited by examiner

*Primary Examiner* — Edward Glick
*Assistant Examiner* — Sang V Nguyen
(74) *Attorney, Agent, or Firm* — H.C. Park & Associates, PLC

(57) ABSTRACT

A lens panel includes a first substrate, a second substrate, and a liquid crystal layer. The first substrate includes a first base substrate, a first electrode disposed on the first base substrate, and a first alignment layer disposed on the first electrode. The first alignment layer includes a unit lens area. The unit lens area includes a first alignment area having a first azimuthal angle and a second alignment area having a second azimuthal angle. The lens panel may be controlled to function as a Fresnel lens by adjusting the azimuthal angle of the alignment layer without electrodes having micro pitch patterns.

10 Claims, 12 Drawing Sheets

<2D MODE>

<3D MODE>

LENS PANEL, METHOD FOR MANUFACTURING LENS PANEL, AND DISPLAY APPARATUS HAVING LENS PANEL

CROSS REFERENCE TO RELATED APPLICATION

This application claims priority from and the benefit of Korean Patent Application No. 2011-0054536, filed on Jun. 7, 2011, which is hereby incorporated by reference for all purposes as if fully set forth herein.

BACKGROUND OF THE INVENTION

1. Technical Field

Exemplary embodiments of the present invention relate to a lens panel, a method of manufacturing a lens panel, and a display apparatus having a lens panel. More particularly, exemplary embodiments of the present invention relate to a lens panel for displaying a two-dimensional ("2D") image and a three-dimensional ("3D") image, a method of manufacturing the lens panel, and a display apparatus having the lens panel.

2. Discussion of the Background

As the demands for displaying a three dimensional ("3D") image have been increasing in the video game and movie industries, a stereoscopic image display apparatus has been developed to display the 3D image. The stereoscopic image display apparatus may provide two different two-dimensional ("2D") images to two eyes of an observer to display the 3D image. The observer views a pair of 2D images through their two eyes, and their brain mixes the 2D images so that the observer may recognize the stereoscopic image.

The stereoscopic image display apparatus may be divided into a stereoscopic type and an auto-stereoscopic type depending on whether a user is required to wear glasses to see the 3D image. In flat panel display apparatuses, the auto-stereoscopic type, such as, a lenticular type, have been generally used.

In the lenticular type apparatus, lights passing through a left pixel and a right pixel are refracted by a lens, which may be a convex lens or a Fresnel lens, to display a 3D image. Recently, a liquid crystal lens functioning in substantially the same manner as a convex lens and a Fresnel lens has been used rather than the convex lens and the Fresnel lens. The liquid crystal lens includes an upper electrode, a lower electrode and a liquid crystal layer disposed between the upper and lower electrodes. Voltages are applied to the upper and lower electrodes so that a thickness and a shape of the convex lens and the Fresnel lens in the liquid crystal lens may be controlled.

In order to implement the Fresnel lens in the liquid crystal lens, voltages are applied to a plurality of electrodes. If the number of the electrodes increases, a thickness of the lens may be decreased. However, as the number of electrodes increase a gap between the electrodes may decrease resulting in an increase in the resistance of the electrode, and a possible disconnection of the electrode may occur.

The above information disclosed in this Background section is only for enhancement of understanding of the background of the invention and therefore it may contain information that does not form any part of the prior art.

SUMMARY OF THE INVENTION

Exemplary embodiments of the present invention provide a lens panel using photo-alignment capable of decreasing response time and improving reliability.

Exemplary embodiments of the present invention also provide a method of manufacturing a lens panel.

Exemplary embodiments of the present invention also provide a display apparatus including a lens panel.

Additional features of the invention will be set forth in the description which follows, and in part will be apparent from the description, or may be learned by practice of the invention.

An exemplary embodiment of the present invention a lens panel including: a first substrate including a first base substrate, a first electrode disposed on the first base substrate, and a first alignment layer disposed on the first electrode, the first alignment layer including a unit lens area, the unit lens area including a first alignment area having a first azimuthal angle and a second alignment area having a second azimuthal angle; a second substrate including a second base substrate, a second electrode disposed on the second base substrate, and a second alignment layer disposed on the second electrode and having a third azimuthal angle; and a liquid crystal layer disposed between the first substrate and the second substrate.

An exemplary embodiment of the present invention also discloses a method of manufacturing a lens panel, the method including: forming a first electrode on a first base substrate; forming a first photo-reactive polymeric layer on the first electrode; forming a first alignment layer by irradiating a light to the first photo-reactive polymeric layer, the first alignment layer including a unit lens area, the unit lens area including a first alignment area having a first azimuthal angle and a second alignment area having a second azimuthal angle; forming a second electrode on a second base substrate; and forming a second alignment layer having a third azimuthal angle on the second electrode.

An exemplary embodiment of the present invention also discloses a display apparatus including: a panel module to display a two-dimensional image or a three-dimensional image; a lens panel including: a first substrate including a first base substrate, a first electrode disposed on the first base substrate, and a first alignment layer disposed on the first electrode, the first alignment layer including at least one of unit lens area, the unit lens area including a first alignment area having a first azimuthal angle and a second alignment area having a second azimuthal angle; a second substrate including a second base substrate, a second electrode disposed on the second base substrate, and a second alignment layer disposed on the second electrode and having a third azimuthal angle, the third azimuthal angle being substantially perpendicular to the first azimuthal angle and the second azimuthal angle; and a liquid crystal layer disposed between the first substrate and the second substrate; and a light source module disposed under the panel module, and the light source module to provide light to the panel module.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
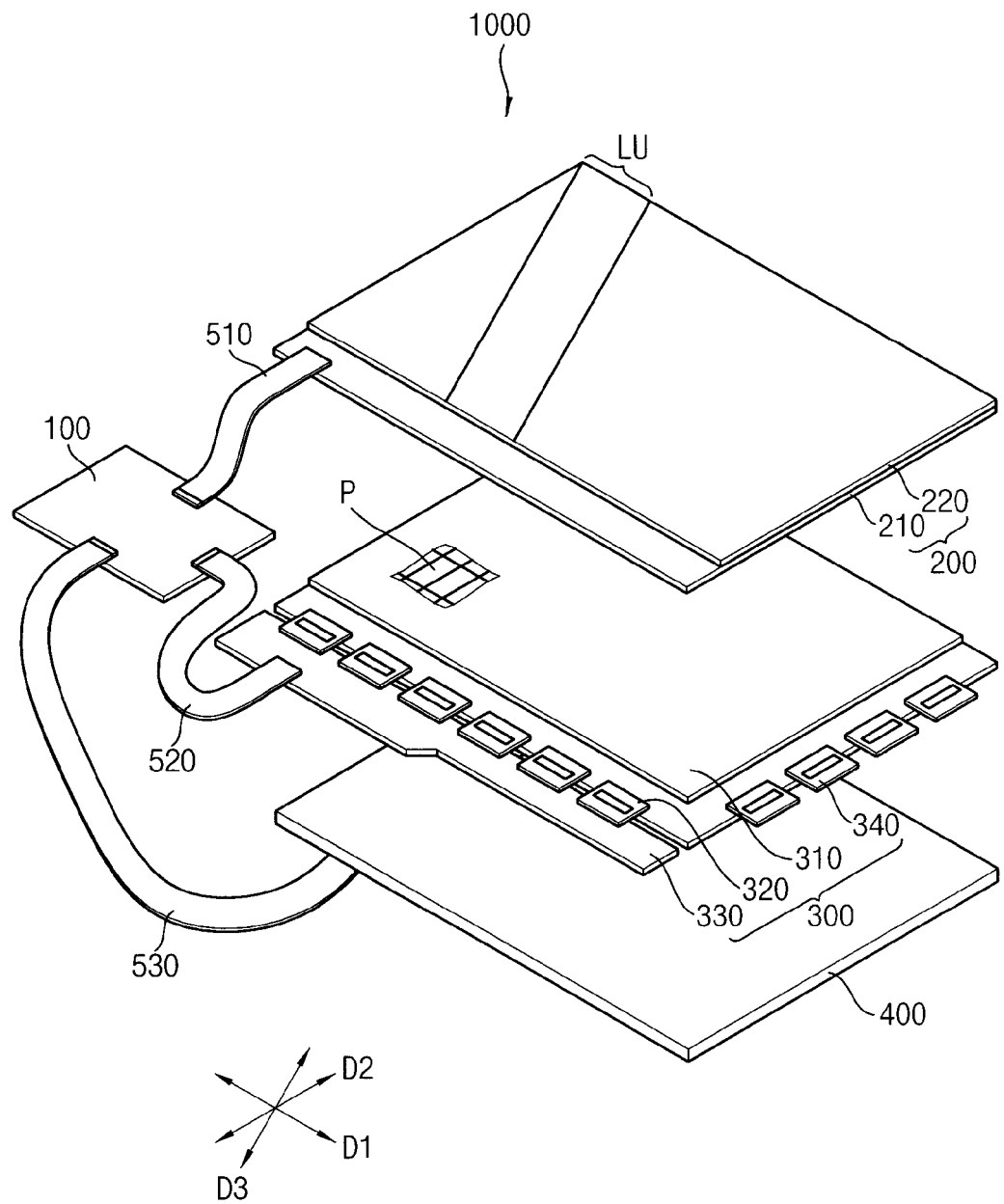
FIG. 1 is a perspective view illustrating a display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present.

FIG. 1 is a perspective view illustrating a display apparatus according to an exemplary embodiment of the present invention.

Referring to FIG. 1, a display apparatus 1000 includes a controller 100, a lens panel 200, a panel module 300, and a light source module 400.

The controller 100 receives a two-dimensional ("2D") image data or a three-dimensional ("3D") image data from an external apparatus. The controller 100 controls the display apparatus 1000 to display a 2D image or a 3D image. Particularly, the controller 100 determines whether the lens panel 200 is driven as a Fresnel lens, and whether the panel module 300 displays the 3D image. In addition, the controller 100 adjusts a luminance of the light source module 400 based on the image displayed by the display apparatus 1000. For example, if the display apparatus 1000 is operated in a 2D mode, the controller 100 controls the light source module 400 to provide light having a first luminance. If the display apparatus 1000 is operated in a 3D mode, the controller 100 controls the light source module 400 to provide light having a second luminance that is greater than the first luminance.

The lens panel 200 includes a first substrate 210, a second substrate 220, and a liquid crystal layer disposed between the first substrate 210 and the second substrate 220. The first substrate 210 and the second substrate 220 include a first alignment layer and a second alignment layer, respectively, that initially aligns the liquid crystal layer. The first alignment layer is entirely aligned with a single direction. The second alignment layer is divided into a plurality of aligning areas. The aligning areas of the second alignment layer are aligned with different directions. Thus, if voltages are applied to the lens panel 200, multiple unit lenses LU are formed by the first alignment layer and the second alignment layer. The lens panel 200 may be driven in the 2D mode or the 3D mode. For example, if the display apparatus 1000 displays the 3D image, voltages are applied to the first substrate 210 and the second substrate 220, and an arrangement of liquid crystal molecules of the liquid crystal layer is adjusted according to an electric field formed between the first substrate 210 and the second substrate 220. The liquid crystal molecules have various azimuthal angles and phase differences according to initial alignment of the liquid crystal layer by the first alignment layer and the second alignment layer. According to the various azimuthal angles and the phase differences, the lens panel 200 may include multiple unit lenses LU, each of which functions as a Fresnel lens. Thus, the lens panel 200 refracts light provided from a panel module 300 so that an observer may view a 3D image.

The panel module 300 includes the display panel 310, a data driver 320, a source printed circuit board 330, and a gate driver 340. The data driver 320 applies a data voltage to a pixel P. The data driver 320 is electrically connected to the source printed circuit board 330. The gate driver 340 provides a gate signal to the pixel P. The gate signal controls a charging timing of the data voltage to the pixel P. The gate driver 340 may be mounted on the display panel 310 as a chip type driver. Alternatively, the gate driver 340 may be integrally formed on the display panel 310 in a fabricating process of a thin film transistor of the display panel 310.

The light source module 400 provides light to the panel module 300. The light source module 400 includes a light source (not shown) to generate light. The light source may include a fluorescent lamp or a light emitting diode. The light source module 400 may be a direct type light source module or an edge type light source module according to a position of the light source. If the light source module 400 is an edge type light source module, the light source module 400 may further include a light guide plate.

The display apparatus 1000 may further include a first connecting part 510, a second connecting part 520, and a third connecting part 530, which electrically connect the controller 100, the lens panel 200, the panel module 300, and the light source module 400. The first connecting part 510, the second connecting part 520, and the third connecting part 530 may include flexible printed circuit boards ("FPCB").

The first connecting part 510 may be connected to the lens panel 200, and may directly apply voltages to the first substrate 210 and the second substrates 220.

Figure 2:
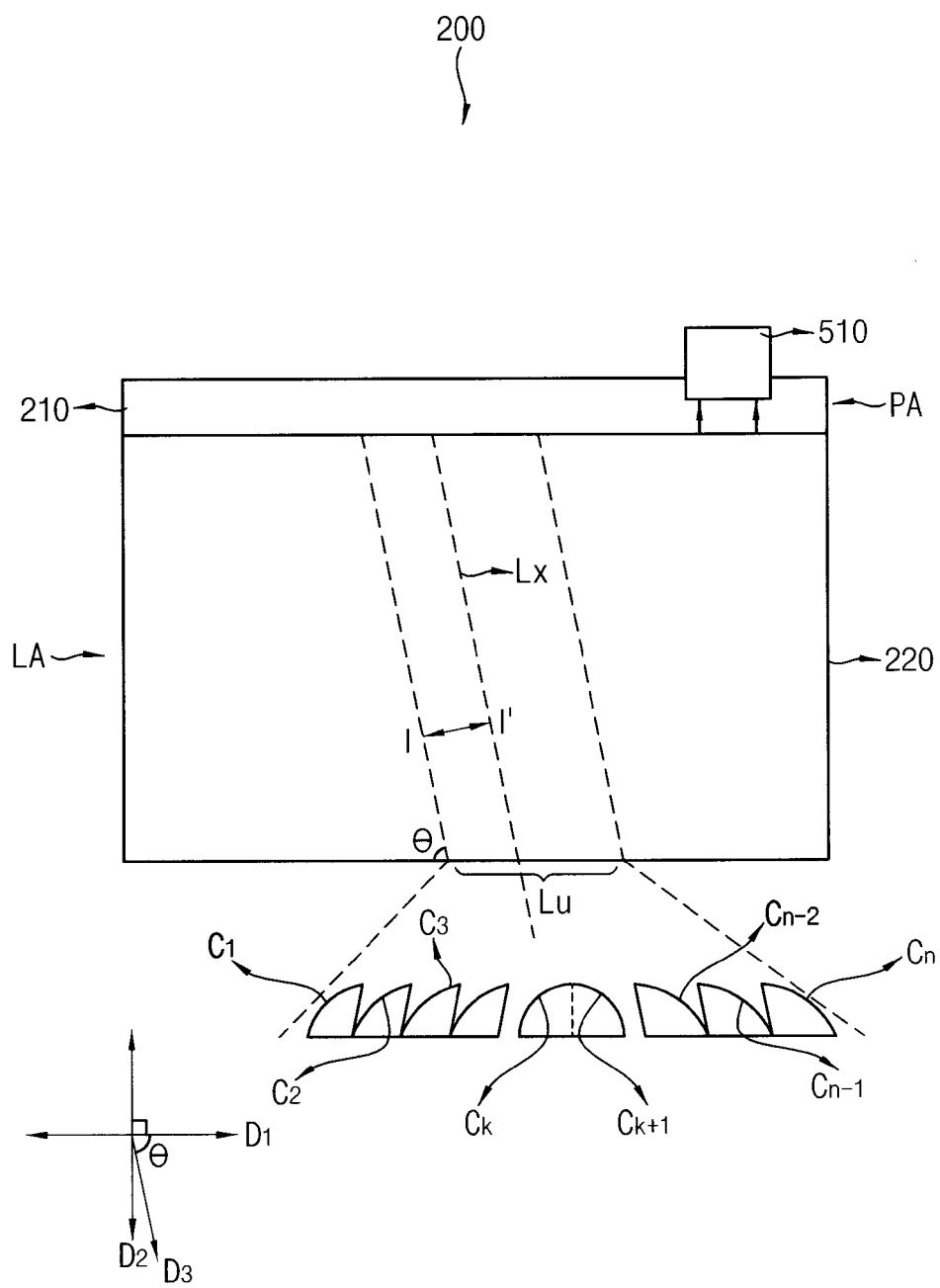
FIG. 2 is a plan view illustrating a lens panel of FIG. 1 according to an exemplary embodiment of the present invention.
Figure 3:
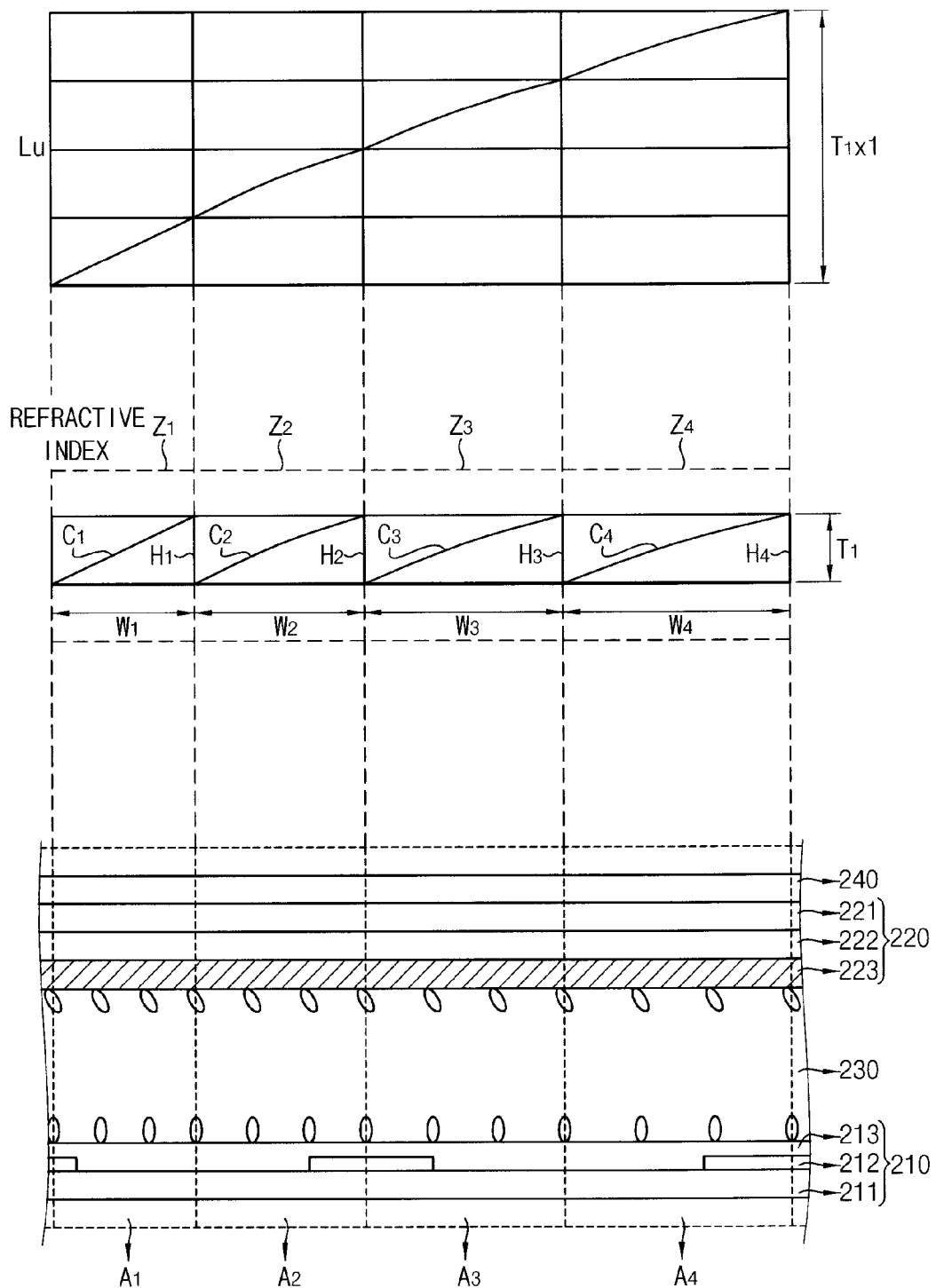
FIG. 3 is a cross-sectional view taken along a line I-I' of FIG. 2 and a graph illustrating a refractive index according to an exemplary embodiment of the present invention.

FIG. 2 is a plan view illustrating the lens panel 200 of FIG. 1. FIG. 3 is a cross-sectional view taken along a line I-I' of FIG. 2 and a graph illustrating a refractive index distribution of the unit lens LU.

Referring to FIG. 1, FIG. 2, and FIG. 3, the lens panel 200 includes the first substrate 210, the second substrate 220 facing the first substrate 210 and the liquid crystal layer 230 disposed between the first substrate 210 and the second substrate 220. In the present exemplary embodiment, the liquid crystal layer 230 includes a liquid crystal material having a negative permittivity, and vertically aligned if an electric field is not formed. However, the present exemplary embodiment is not limited thereto, and the liquid crystal layer 230 may include a different kind of a liquid crystal material.

The lens panel 200 includes a lens area LA, where multiple unit lenses LU are disposed, and a peripheral area PA adjacent to a side of the lens area LA.

The peripheral area PA is connected to first connecting part 510, to transmit the voltages to the lens area LA. The first connecting part 510 may be a flexible printed circuit board.

If the voltages are applied to the lens panel 200, multiple unit lenses LU are formed in the lens area LA. The unit lens LU has a lens axis Lx inclined with respect to a second direction D2. An inclined angle θ of the unit lens LU is defined with respect to a first direction D1 which is substantially perpendicular to the second direction D2. The lens axis Lx is parallel with a third direction D3. The multiple unit lenses LU are inclined in the inclined angle θ, and are disposed parallel with each other. Although the lens axis Lx is depicted as inclined by the inclined angle θ, the lens axis Lx may be parallel to the second direction D2.

Referring to FIG. 3, if voltages are applied to the lens panel 200, multiple unit lenses LU are formed. The unit lens LU functions as a Fresnel lens having a plurality of refractive portions Z1, Z2, Z3, Z4, . . . , Zn-2, Zn-1, and Zn.

The Fresnel lens is defined by dividing a convex lens into the plurality of refractive portions Z1, Z2, Z3, Z4, . . . , Zn-2, Zn-1, and Zn having a uniform thickness. The Fresnel lens includes a plurality of arc portions C1, C2, C3, C4, . . . , Cn-2, Cn-1, and Cn corresponding to the plurality of refractive portions Z1, Z2, Z3, Z4, . . . , Zn-2, Zn-1, and Zn, respectively. The refractive portions Z1, Z2, Z3, Z4, . . . , Zn-2, Zn-1, and Zn of the Fresnel lens have the arc portions C1, C2, C3, C4, . . . , Cn-2, Cn-1, and Cn and vertical portions H1, H2, H3, H4, . . . , Hn-2, Hn-1, and Hn, respectively. The vertical portions H1, H2, H3, H4, . . . , Hn-2, Hn-1, and Hn are the boundaries between the arc portions C1, C2, C3, C4, . . . , Cn-2, Cn-1, and Cn. The Fresnel lens has a symmetric shape with respect to a central portion of the Fresnel lens. Lengths of the vertical portions H1, H2, H3, H4, . . . , Hn-2, Hn-1, and Hn are substantially the same as each other. Widths W1, W2, W3, W4, . . . , Wn-2, Wn-1, and Wn of the refractive portions Z1, Z2, Z3, Z4, . . . , Zn-2, Zn-1, and Zn in a horizontal direction increase as the refractive portions Z1, Z2, Z3, Z4, . . . , Zn-2, Zn-1, and Zn get closer to the central portion of the Fresnel lens. A thickness of the Fresnel lens is 1/k of a thickness of the convex lens corresponding to the Fresnel lens. Herein, k is a natural number which is n/2 where n is the number of arc portions included in the Fresnel lens.

Thus, the lens panel 200 is divided into a plurality of alignment areas A1, A2, A3, A4, . . . , An which form the unit lens LU corresponding to the refractive portions Z1, Z2, Z3, Z4, . . . , Zn-2, Zn-1, and Zn of the Fresnel lens. The liquid crystal molecules may be aligned differently from each other according to the alignment areas A1, A2, A3, A4, . . . , An. For example, the liquid crystal molecules disposed at the vertical portion may have a relatively large alignment angle in each of the alignment areas A1, A2, A3, A4, . . . , An. The alignment angles of the liquid crystal molecules in each of the alignment areas A1, A2, A3, A4, . . . , An may decrease as a distance of each of the alignment areas A1, A2, A3, A4, . . . , An from the central portion of the unit lens LU increases.

If the voltages are applied to the lens panel 200, the liquid crystal molecules of the liquid crystal layer 230 disposed between the first substrate 210 and the second substrate 220 have various refractive indexes and phase differences to form the unit lens LU according to the various initial alignment angles. Thus, the lens panel 200 functions as a Fresnel lens.

The first substrate 210 includes a first base substrate 211. Multiple first electrodes 212 are disposed on the first base substrate 211. The first electrode 212 may include a transparent conductive material. For example, the first electrode 212 may include indium tin oxide ("ITO") or indium zinc oxide ("IZO"). The first electrode 212 may include one of ITO, IZO, or a mixture of ITO and IZO.

The first electrode 212 may have a substantially bar shape disposed parallel with the unit lens LU. The first electrodes 212 are disposed on the first base substrate 211 spaced apart from each other. Two alignment areas are formed between two adjacent first electrodes 212. Widths of the first electrodes 212 may increase as the first electrodes 212 get closer to the central portion of the unit lens LU. The widths of the first electrodes 212 may be symmetrical with respect to the central portion of the unit lens LU.

A single voltage may be applied to a single first electrode 212 to drive the lens panel 200.

A first alignment layer 213 is disposed on the first base substrate 211 on which the first electrode 212 is disposed. The first alignment layer 213 may be formed using a photo-reactive polymeric layer. The photo-reactive polymeric layer may be formed by coating a blend including a cinnamate polymer and a polyimide polymer on the first base substrate 211 and curing the blend. The photo-reactive polymeric layer may be irradiated with ultraviolet rays to photo-align the photo-reactive polymeric layer such that the first alignment layer 213 may be formed.

The second substrate 220 includes a second base substrate 221. A second electrode 222 is disposed on the second base substrate 221. The second electrode 222 may be formed on the entire lens area LA of the second base substrate 221 without a patterning process. The second electrode 222 may include a material substantially the same as the first electrode 221. The second electrode 222 is formed without the patterning process so that a single voltage may be applied to the second electrode 222 corresponding to an entire area of the lens panel 200.

A second alignment layer 223 is disposed on the second base substrate 221 on which the second electrode 222 is disposed. The second alignment layer 223 may be formed using the photo-reactive polymeric layer. The photo-reactive polymeric layer may be formed by coating a blend including a cinnamate polymer and a polyimide polymer on the second base substrate 221 and curing the blend. The photo-reactive polymeric layer may be irradiated with ultraviolet rays to photo-align the photo-reactive polymeric layer such that the second alignment layer 223 may be formed.

Figure 4:
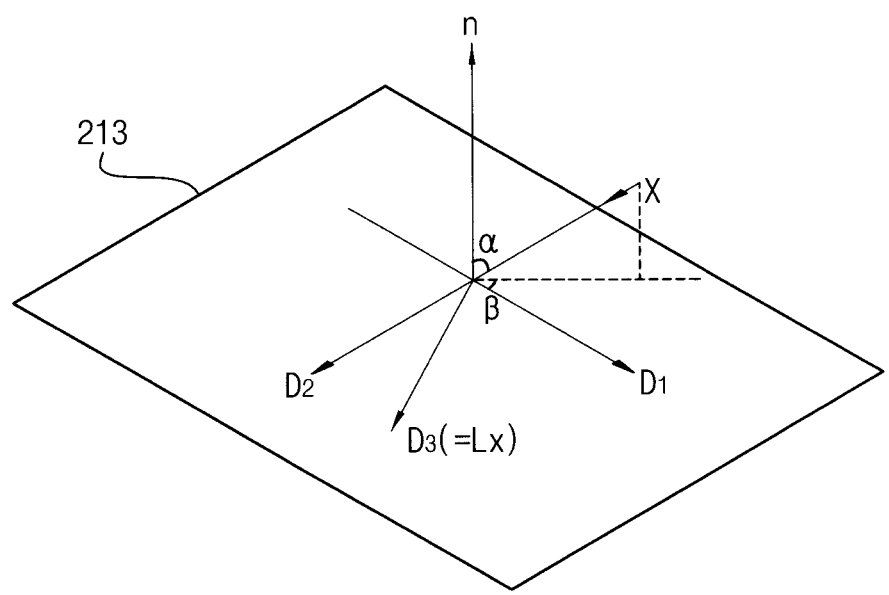
FIG. 4 is a perspective view illustrating a coordinate system of a photo-alignment direction of FIG. 3 according to an exemplary embodiment of the present invention.
Figure 5:
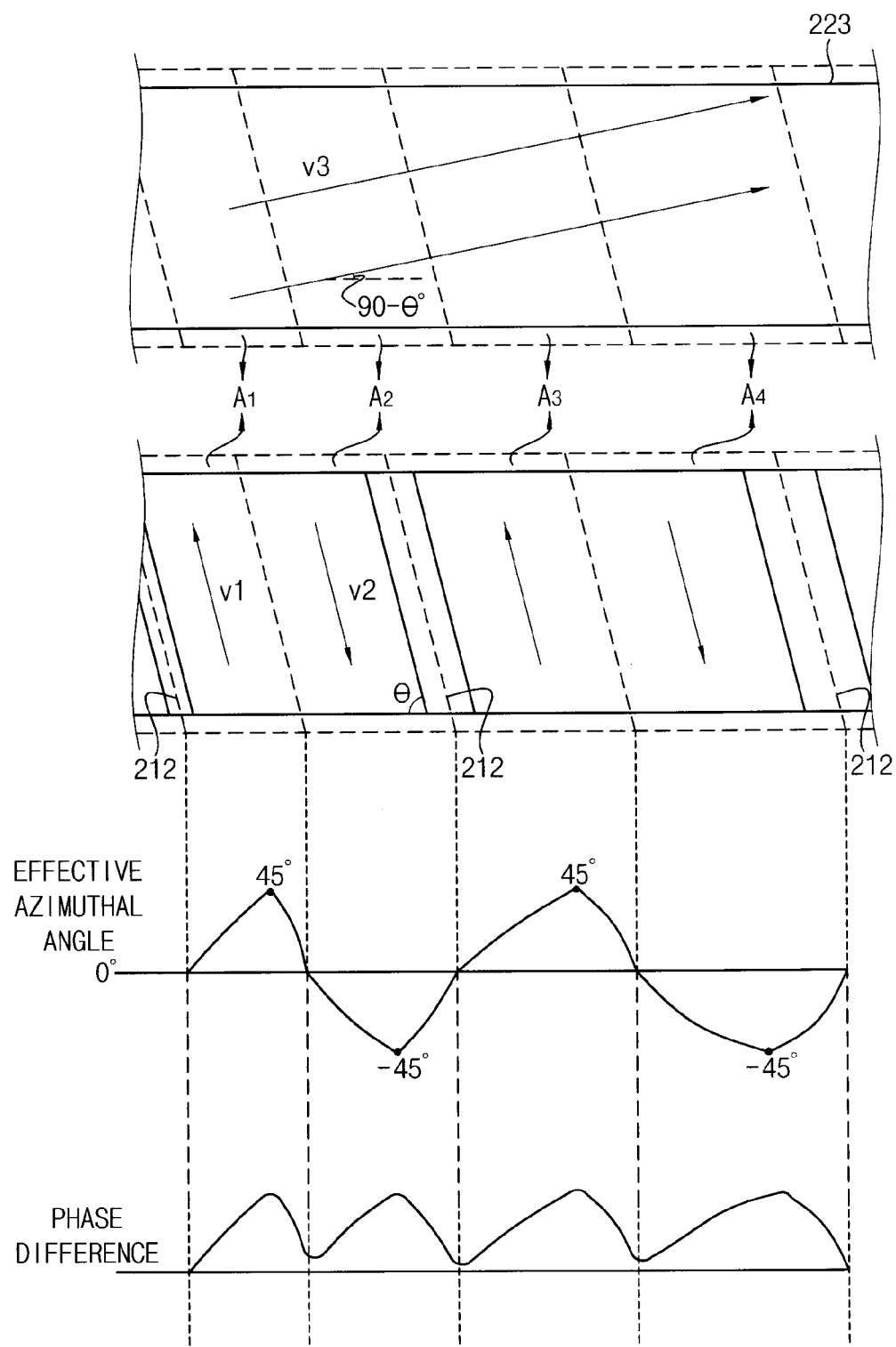
FIG. 5 is a diagram illustrating alignment directions of FIG. 3 and a graph illustrating an effective azimuthal angle and a phase difference according to an exemplary embodiment of the present invention.

FIG. 4 is a perspective view illustrating a coordinate system of a photo-alignment direction of FIG. 3 according to an exemplary embodiment of the present invention. FIG. 5 is a diagram illustrating alignment directions of FIG. 3 and a graph illustrating an effective azimuthal angle and a phase difference according to an exemplary embodiment of the present invention.

In particular, FIG. 4 is a perspective view illustrating a coordinate system defining a photo-alignment direction with respect to the first alignment layer 213 of FIG. 3. FIG. 5 is a conceptual diagram illustrating alignment directions of the first alignment layer 213 and the second alignment layer 223 of FIG. 3 and a graph illustrating an effective azimuthal angle and a phase difference according to the alignment directions of the first alignment layer 213 and the second alignment layer 223 of FIG. 3. A magnitude of a vector in FIG. 5 may conceptually illustrate a magnitude of a polar angle in the alignment direction.

Referring to FIG. 4, a polar angle α is an angle between the alignment direction X and a normal line n of the first alignment layer 213. Thus, an angle between the alignment direction and the first alignment layer 213 is 90−α. In addition, the azimuthal angle β is an angle between a positive direction of the first direction D1 and an orthogonal projection line of the alignment direction X on the first alignment layer 213. The second alignment layer 223 is parallel with the first alignment layer 213 so that the coordinate system of FIG. 4 may be a photo-alignment direction with respect to the second alignment layer 223.

Referring to FIG. 2, FIG. 3, FIG. 4, and FIG. 5, the first alignment layer 213 is aligned with the third direction D3, which is parallel to the lens axis Lx. More particularly, the first alignment layer 213 is aligned according to the alignment areas A1, A2, A3, A4, ..., An, which are corresponding to the refractive portions Z1, Z2, Z3, Z4, ..., Zn of the unit lens LU. The widths of the refractive areas Z1, Z2, Z3, Z4, ..., Zn increase as the refractive portions Z1, Z2, Z3, Z4, ..., Zn get closer to the central portion of the unit lens LU and thus the widths of the alignment areas A1, A2, A3, A4, ..., An may increase as the alignment areas A1, A2, A3, A4, ..., An get closer to the central portion of the unit lens LU.

The adjacent alignment areas are aligned to have alignment directions opposite to each other. For example, the first alignment layer 213 may include two alignment areas, alignment area A1 and alignment area A2, between adjacent first electrodes 212. The alignment area A1 may be aligned with a positive direction of the third direction D3 and the alignment area A2 may be aligned with a negative direction of the third direction D3. For example, if a first alignment area A1 is aligned with the positive direction of the third direction D3, a second alignment area A2 adjacent to the first alignment area A1 is aligned with the negative direction of the third direction D3. The first alignment layer 213 may entirely have a single polar angle. For example, the first alignment layer 213 may have a polar angle of about 1° to about 5°.

Referring to FIG. 5, the second alignment layer 223 may be aligned with a direction of 90-θ°, which is substantially perpendicular to the lens axis Lx. The second alignment layer 223 may have a single polar angle. Thus, the azimuthal angle of the first alignment layer 213 may be substantially perpendicular to the azimuthal angle of the second alignment layer 223. For example, the second alignment layer 223 may have the polar angle of about 1° to about 5°. The liquid crystal molecules of the liquid crystal layer 230 are initially aligned by the first alignment layer 213 and the second alignment layer 223. If the voltages are applied to the first electrode 212 and the second electrode 222, an electric field is formed at the liquid crystal layer 230. The liquid crystal molecules of the liquid crystal layer 230 are aligned with various effective azimuthal angles by the initial alignment of the liquid crystal molecules in various inclined directions so that the unit lens LU may function as a Fresnel lens.

Referring to FIG. 3 and FIG. 5, if the electric field is not formed at the liquid crystal layer 230 of the lens panel 200, the liquid crystal molecules are vertically aligned with a substantially perpendicular direction with respect to the first substrate 210 and the second substrate 220.

The first alignment area A1 may be aligned with the positive direction of the third direction D3. Thus, the liquid crystal molecules in the first alignment area A1 are aligned along a direction of a sum vector of a first vector v1 of the first alignment layer 213 and a third vector v3 of the second alignment layer 223. The first vector v1 is parallel with the alignment direction of the first alignment layer 213. The third vector v3 is parallel with the alignment direction of the second alignment layer 223.

In an exemplary embodiment, two adjacent alignment areas are aligned with directions opposite to each other. The liquid crystal molecules in a portion that overlaps with the first electrode 212 of the first alignment area A1 are aligned by the second alignment layer 223. Thus, the liquid crystal molecules in the portion that overlaps with the first electrode 212 are aligned along the third vector v3 so that the liquid crystal molecules in the portion that overlaps with the first electrode 212 have an effective azimuthal angle of 0°.

The liquid crystal molecules in a portion that does not overlap with the first electrode 212 of the first alignment area A1 are aligned by the direction of the sum vector of the first vector v1 and the third vector v3 and alignment directions of adjacent alignment areas. Thus, the liquid crystal molecules in the first alignment area A1 have an effective azimuthal angle between about 0° and about 45°. In particular, the liquid crystal molecules at both end portions of the first alignment area A1 may have an effective azimuthal angle of about 0°. The effective azimuthal angle of the liquid crystal molecules in the first alignment area A1 increases from about 0° to about 45° and decreases from about 45° to about 0° as the liquid crystal molecules get closer to the central portion of the unit lens LU. The widths of the alignment areas A1, A2, A3, A4, ..., An increase as the alignment areas A1, A2, A3, A4, ..., An get closer to the central portion of the unit lens LU so that an increasing portion of the effective azimuthal angle of the liquid crystal molecules is larger than a decreasing portion of the effective azimuthal angle of the liquid crystal molecules. Thus, the liquid crystal molecules in the first alignment area A1 may have phase differences similar to the refractive portions Z1, Z2, Z3, Z4, ..., Zn of the Fresnel lens.

The second alignment area A2 is aligned with the negative direction of the third direction D3. Thus, the liquid crystal molecules in the second alignment area A2 are aligned along a direction of a sum vector of a second vector v2 of the first alignment layer 213 and the third vector v3 of the second alignment layer 223. The second vector v2 is parallel with the alignment direction of the first alignment layer 213. The second vector v2 has a direction opposite to the first vector v1.

In an exemplary embodiment, two adjacent alignment areas are aligned with directions opposite to each other. The liquid crystal molecules in a portion of second alignment area A2 that overlaps with the first electrode 212 of the second alignment area A2 are aligned by the second alignment layer 223. Thus, the liquid crystal molecules in the portion that overlaps with the first electrode 212 are aligned with the third vector v3 so that the liquid crystal molecules in the portion that overlaps with the first electrode 212 have an effective azimuthal angle of 0°.

The liquid crystal molecules in a portion of the second alignment area A2 that does not overlap with the first electrode 212 of the second alignment area A2 are aligned by the direction of the sum vector of the second vector v2 and the third vector v3 and alignment directions of adjacent alignment areas. Thus, the liquid crystal molecules in the second alignment area A2 have an effective azimuthal angle between about 0° and about 45°. Particularly, the liquid crystal molecules at both end portions of the second alignment area A2 have the effective azimuthal angle of about 0°. The effective azimuthal angle of the liquid crystal molecules in the second alignment area A2 increases from about 0° to about 45° and then decreases from about 45° to about 0° as the liquid crystal molecules get closer to the central portion of the unit lens LU. The widths of the alignment areas A1, A2, A3, A4, . . . , An increase as the alignment areas A1, A2, A3, A4, . . . , An get closer to the central portion of the unit lens LU so that an increasing portion of the effective azimuthal angle of the liquid crystal molecules is larger than a decreasing portion of the effective azimuthal angle of the liquid crystal molecules. Thus, the liquid crystal molecules in the second alignment area A2 may have phase differences similar to the refractive portions Z1, Z2, Z3, Z4, . . . , Zn of the Fresnel lens.

Therefore, if the voltages are applied to the lens panel 200, the phase differences of the alignment areas A1, A2, A3, A4, . . . , An increase as the alignment areas A1, A2, A3, A4, . . . , An get closer to the central portion of the unit lens LU so that the unit lens LU functions as a Fresnel lens.

Referring again to FIG. 3, the lens panel 200 may further include a light blocking film 240 disposed on the second base substrate 221. The light blocking film 240 may be disposed on a surface opposite to the second alignment layer 223 of the second substrate 220. If the lens panel 200 is driven for a long time, the lens panel may be exposed to an external light for a long time and a light transmittance of the lens panel 200 may be decreased. For example, when the lens panel 200 was exposed to sunlight for about 1000 hours, the light transmittance of the lens panel 200 was decreased by about 3% to 8%. The decrease of the light transmittance of the lens panel 200 may be caused by changes of the initial alignment angles in the first alignment layer 213 and the second alignment layer 223 by sunlight. Thus, the lens panel 200 may further include the light blocking film 240 on the surface opposite to the second alignment layer 223. The light blocking film 240 may be a film capable of absorbing an ultraviolet ray and short-wavelength rays.

Alternatively, the second base substrate 221 may include a light blocking material instead of attaching the light blocking film 240 on the second base substrate 221. For example, the light blocking material may be capable of absorbing the ultraviolet ray and the short-wavelength rays.

According to an exemplary embodiment, the unit lens LU is driven as a Fresnel lens, which has multiple arc portions, such that a cell gap of the lens panel 200 may be decreased. Thus, a manufacturing effectiveness of the liquid crystal lens panel 200 may be improved, and a manufacturing cost of the liquid crystal lens panel 200 may be decreased.

In addition, gaps between the first electrodes 212 of the lens panel 200 may relatively increase and the first alignment layer 213 is divided into the plurality of alignment areas having opposite azimuthal angles such that the lens panel 200 may be controlled to function as a Fresnel lens by adjusting an azimuthal angle of the alignment layer without electrodes having micro pitch patterns. Thus, a load for fabricating the micro pitch patterns may be decreased, and a reliability of the lens panel 200 may be improved.

In addition, a single voltage is applied to the first electrode 212 so that the single voltage may be directly applied to the first electrode 212 without using an additional data driver for the lens panel 200. Thus, structures of a lens panel driver may be simplified, and the manufacturing cost may be decreased.

If the second base substrate 221 includes the light blocking material or the lens panel includes the light blocking film 240, the deterioration of the alignment layer by the external light may be prevented so that the reliability of the lens panel may be improved while in use for longer period of time.

Figure 6:
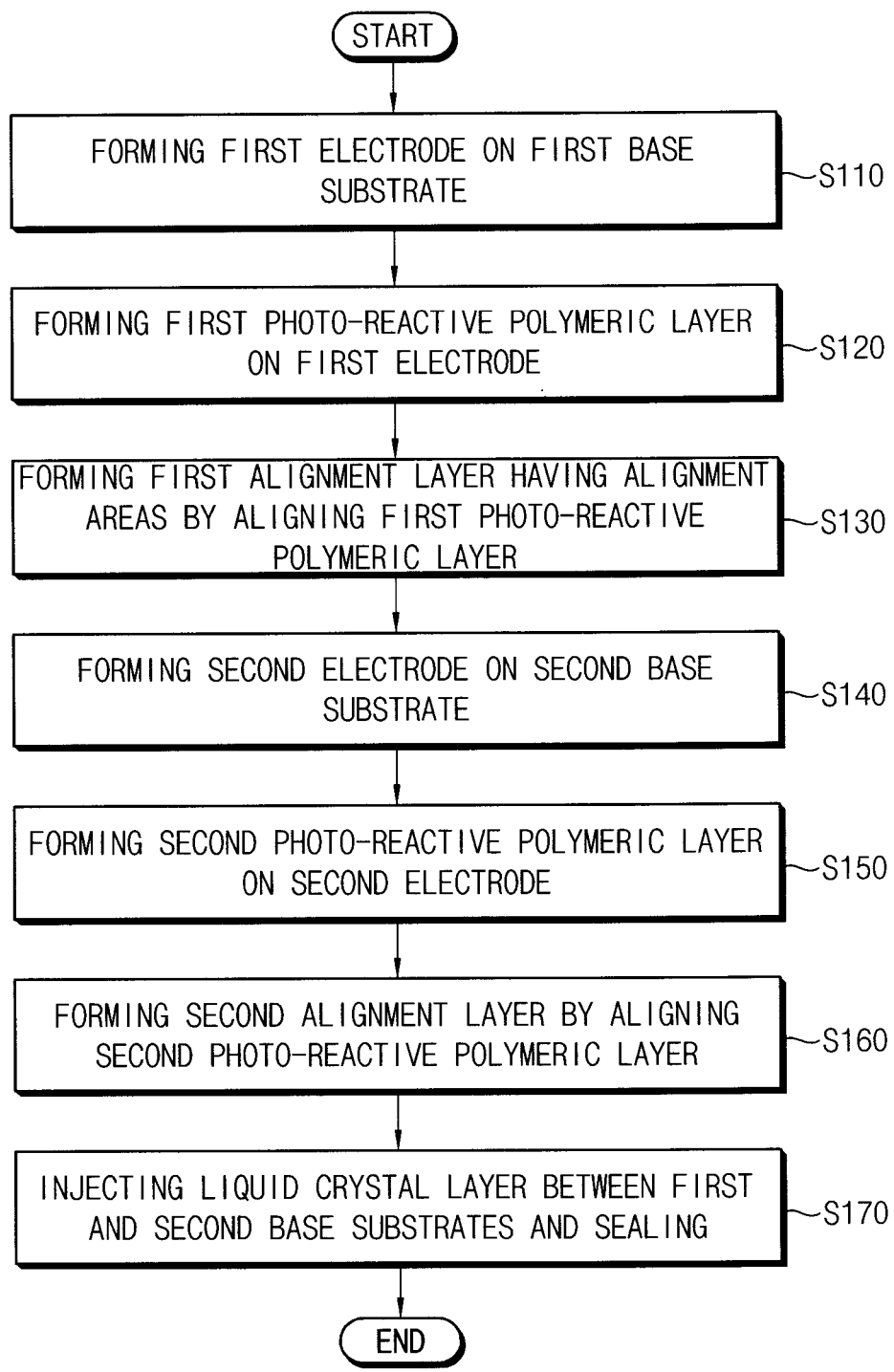
FIG. 6 is a flow chart illustrating a method for manufacturing a lens panel according to an exemplary embodiment of the present invention.
Figure 7A:
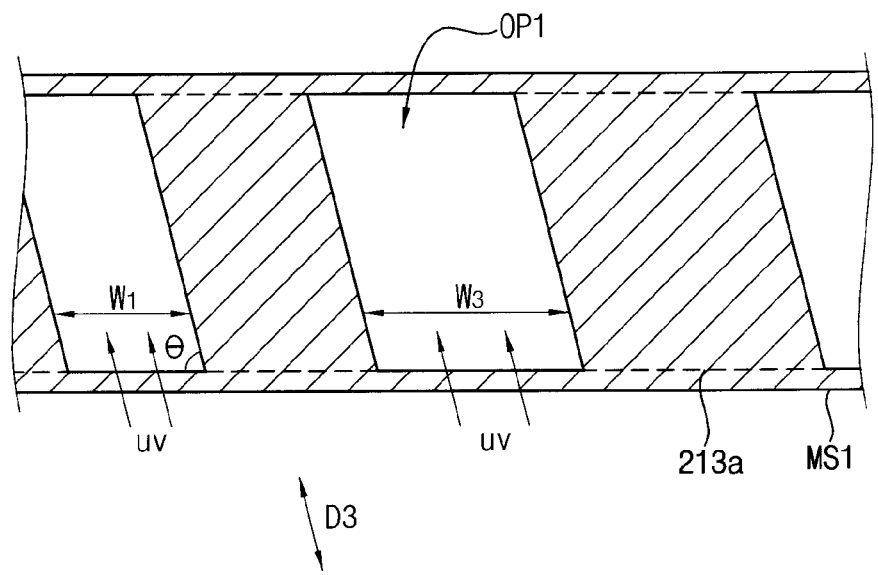
FIG. 7A is a plan view of an alignment layer of FIG. 3 according to an exemplary embodiment of the present invention.
Figure 7B:
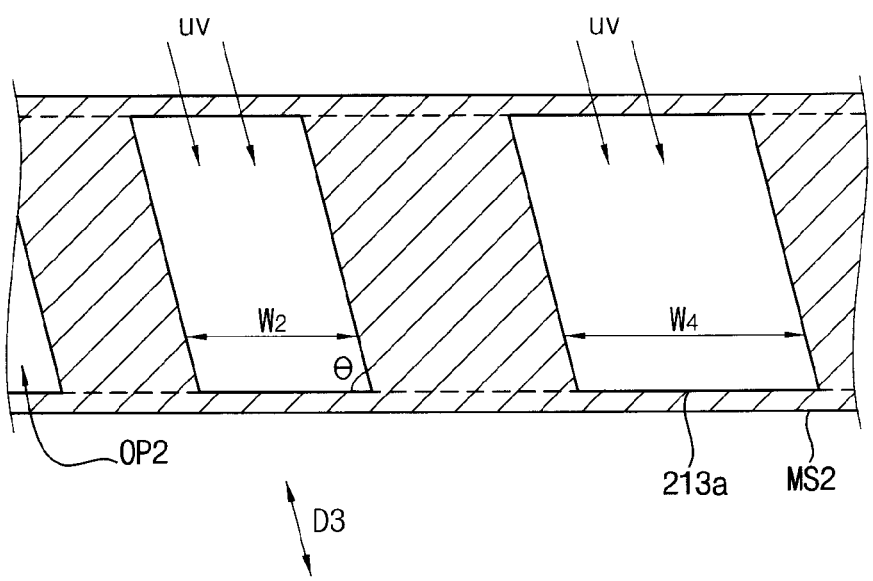
FIG. 7B is a plan view of an alignment layer of FIG. 3 according to an exemplary embodiment of the present invention.
Figure 8:
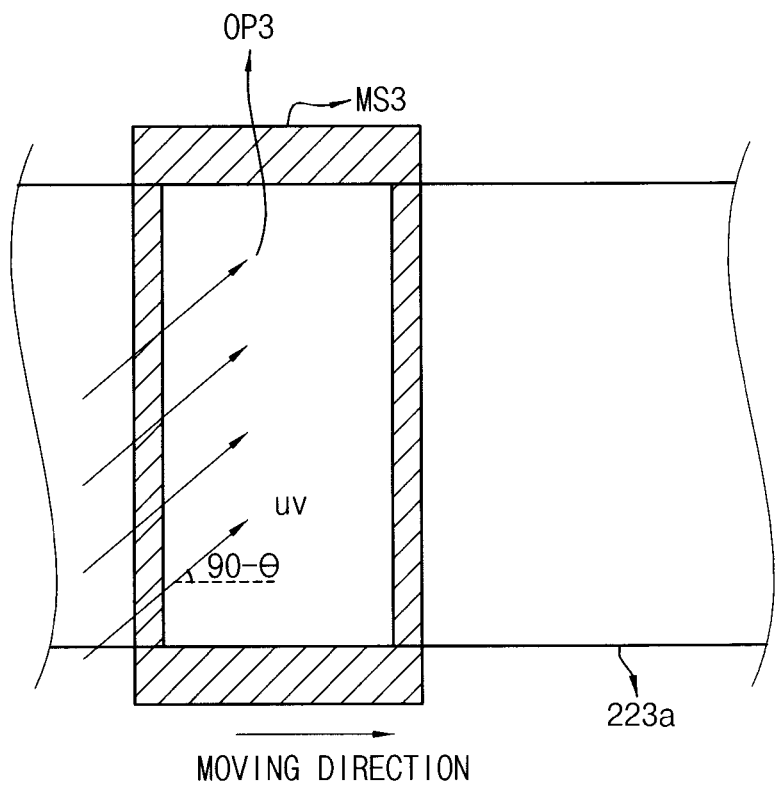
FIG. 8 is a plan view of an alignment layer of FIG. 3 according to an exemplary embodiment of the present invention.
Figure 8:
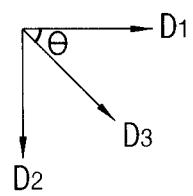

FIG. 6 is a flow chart illustrating a method for manufacturing a lens panel according to an exemplary embodiment of the present invention. FIG. 7A is a plan view of an alignment layer of FIG. 3 according to an exemplary embodiment of the present invention. FIG. 7B is a plan view of an alignment layer of FIG. 3 according to an exemplary embodiment of the present invention. FIG. 8 is a plan view of an alignment layer of FIG. 3 according to an exemplary embodiment of the present invention.

Referring to FIG. 3 and FIG. 6, in operation S110 the first electrode 212 is formed on the first base substrate 211. The first electrode 212 may include a transparent conductive material. For example, the first electrode 212 may include indium tin oxide ("ITO") or indium zinc oxide ("IZO"). The first electrode 212 may include one of ITO, IZO, or a mixture of ITO and IZO. The transparent conductive material is coated on the first base substrate 211. The transparent conductive material is patterned by a photo-resist process to form the first electrode 212. The first electrode 212 may have a substantially bar shape.

In operation S120, a first photo-reactive polymeric layer is formed on the first base substrate 211 on which the first electrode 212 is formed The first photo-reactive polymeric layer may be formed by coating a blend including a cinnamate polymer and a polyimide polymer on the first electrode 212 and curing the blend.

For example, the cinnamate polymer and the polyimide polymer may be mixed at a ratio of 1:9 or 9:1 with each other. The mixture of the cinnamate polymer and the polyimide polymer is dissolved in an organic solvent, and the polymer dissolved in the organic solvent is coated on the substrate using a spin coating method. The coated polymer is hardened by heat so that the first photo-reactive polymeric layer may be formed.

Referring to FIG. 6, FIG. 7A and FIG. 7B, in operation S130, the ultraviolet ray is irradiated to the first photo-reactive polymeric layer 213a so that the first alignment layer 213 including the plurality of alignment areas A1, A2, A3, A4, . . . , An having various azimuthal angles may be formed. For example, the first base substrate 211 is exposed through opening portions of first mask MS1 and second mask MS2 by an external exposure apparatus so that the first alignment layer 213 is formed.

The first mask MS1 includes multiple first opening portions OP1. The first opening portions OP1 of the first mask MS1 are disposed on portions of the first alignment layer 213 that do not overlap with the first electrode 212 of odd numbered alignment areas A1, A3, . . . , A2n−1. Thus, areas and widths in the first direction D1 of the first opening portions OP1 increase as the first opening portions OP1 get closer to the central portion of the unit lens LU. For example, the first opening portion OP1 disposed on the first alignment area A1 may have a first width W1 substantially the same as the width of the first alignment area A1. The first opening portion OP1 disposed on the third alignment area A3 may have a third width W3 substantially the same as the width of the third alignment area A3.

The second mask MS2 includes multiple second opening portions OP2. The second opening portions OP2 of the second mask MS2 are disposed on portions of the first alignment layer 213 that do not overlap with the first electrode 212 of even numbered alignment areas A2, A4, ..., A2n. Thus, areas and widths in the first direction D1 of the second opening portions OP2 increase as the second opening portions OP2 get closer to the central portion of the unit lens LU. For example, the second opening portion OP2 disposed on the second alignment area A2 may have a second width W2 substantially the same as the width of the second alignment area A2. The second opening portion OP2 disposed on the fourth alignment area A4 may have a fourth width W4 substantially the same as the width of the fourth alignment area A4.

The first base substrate 211 is disposed under the first mask MS1. The ultraviolet rays are irradiated on the first mask MS1. The first photo-reactive polymeric layer 213a is aligned through the first opening portions OP1 so that the odd numbered alignment areas A1, A3, ..., A2n–1 are formed.

After exposing the first photo-reactive polymeric layer 213a under the first opening portion OP1 of the first mask MS1 during a time period with a fixed irradiating energy of an ultraviolet lamp, the first mask MS1 may be moved to the non-exposed area. Thus, the intensity of the ultraviolet ray irradiated to the first photo-reactive polymeric layer 213a may be uniformly maintained.

The first base substrate 211 is disposed under the second mask MS2. The ultraviolet rays are irradiated to the second mask MS2. The first photo-reactive polymeric layer 213a is aligned through the second opening portions OP2 so that the even numbered alignment areas A2, A4, ..., A2n are formed.

A method of irradiating ultraviolet rays to the second mask MS2 may be substantially the same as the method of irradiating ultraviolet rays to the first mask MS1.

The ultraviolet rays are irradiated to the first photo-reactive polymeric layer 213a along the third direction D3.

Thus, the first photo-reactive polymeric layer 213a is aligned using the first mask MS1 and the second mask MS2 such that the first alignment layer 213 may be formed. The first alignment layer 213 includes the alignment area aligned with the positive direction of the third direction D3 and the alignment area aligned with the negative direction of the third direction D3.

In an exemplary embodiment, the first alignment layer 213 may have a polar angle of about 1° to about 5°. In order to align the first alignment layer 213 having a polar angle of about 2°, an intensity of the ultraviolet ray may be about 20 mJ. The polar angle of the first alignment layer 213 of an exemplary embodiment is in a range of the polar angle according to a conventional process of forming the alignment layer so that the first alignment layer 213 may be formed using a conventional manufacturing apparatus.

In operation S140, the second electrode 222 is formed on the second base substrate 221. The second electrode 222 may include a material substantially the same as the first electrode 221. The second electrode 222 may be formed by coating a transparent conductive material on the entire second base substrate 221.

In operation S150, a second photo-reactive polymeric layer is formed on the second base substrate 221 on which the second electrode 222 is formed. The second photo-reactive polymeric layer may be formed by a process substantially the same as forming the first photo-reactive polymeric layer.

FIG. 8 is a plan view of an alignment layer of FIG. 3 according to an exemplary embodiment of the present invention.

Referring to FIG. 6 and FIG. 8, in operation S160, an ultraviolet ray is irradiated to the second photo-reactive polymeric layer 223a so that the second alignment layer 223, which is photo-aligned to have a single polar angle and a single azimuthal angle, may be formed. For example, the second alignment layer 223 may be disposed under a third mask MS3, and the third mask MS3 may move along the first direction D1 so that the second alignment layer 223 passes through exposure portions of the third mask MS3 using the external exposure apparatus.

The third mask MS3 may include a third opening portion OP3. The third opening portion OP3 may have a substantially rectangular shape. The second alignment layer 223 is aligned to have a single polar angle and a single azimuthal angle. By moving the mask M3, in the direction and the intensity of ultraviolet rays irradiated on the second photo-reactive polymeric layer 223a may be uniformly maintained so that the second alignment layer 223 may be aligned to have a single polar angle and a single azimuthal angle.

For example, the second base substrate 221 is exposed under the third mask MS3 with a fixed irradiating energy of the ultraviolet lamp and a moving velocity of the third mask MS3. Thus, the intensity of the ultraviolet rays irradiated to the second photo-reactive polymeric layer 223a may be uniformly maintained.

Alternatively, after exposing the second photo-reactive polymeric layer 223a under the third opening portion OP3 of the third mask MS3 during a time period with a fixed irradiating energy of an ultraviolet lamp, the third mask MS3 may be moved to the non-exposed area. Thus, the intensity of the ultraviolet rays irradiated on the second photo-reactive polymeric layer 223a may be uniformly maintained.

The ultraviolet rays are irradiated to the second photo-reactive polymeric layer 223a in the positive direction of $(90-\theta)°$ with respect to the first direction D1 such that the ultraviolet rays irradiated to the second photo-reactive polymeric layer 223a are substantially perpendicular to the ultraviolet rays irradiated to the first photo-reactive polymeric layer 213a. In addition, the third mask MS3 moves in a direction parallel with the first direction D1.

Thus, ultraviolet rays having a uniform intensity and a uniform direction are irradiated to the second photo-reactive polymeric layer 223a such that the second alignment layer 223 may have a uniform polar angle and a uniform azimuthal angle. For example, if the intensity of the ultraviolet ray is about 20 mJ, the second alignment layer 223 may be aligned to have the polar angle of about 2°.

In operation S170, the liquid crystal material is injected between the first substrate 210 having the first alignment layer 213 and the second substrate 220 having the second alignment layer 223 to form the liquid crystal layer 230, and a gap between the first substrate 210 and the second substrate 220 is sealed so that the lens panel 200 is formed.

Although the second alignment layer 223 is described as formed by irradiating the ultraviolet ray to the photo-reactive polymeric layer using the external exposure apparatus, the invention is not limited thereto. For example, the second alignment layer 223 entirely aligned with a uniform direction may be formed by a rubbing method.

In addition, the lens panel 200 may further include a light blocking film 240 disposed on the second substrate 220. The light blocking film 240 may be disposed on a surface opposite to the second alignment layer 223 of the second substrate 220. Alternatively, the second base substrate 221 may include a light blocking material instead of attaching the light blocking film 240 on the substrate of the second base substrate 221. For example, the light blocking material may be capable of absorbing ultraviolet rays and short-wavelength rays.

According to an exemplary embodiment, gaps between the first electrodes 212 of the lens panel 200 may relatively increase and the first alignment layer 213 may be divided into the plurality of alignment areas having opposite azimuthal angles so that the lens panel 200 may be controlled to function as a Fresnel lens by adjusting an azimuthal angle of the alignment layer without electrodes having micro pitch patterns. Thus, a load for fabricating the micro pitch patterns may be decreased, and a reliability of the lens panel 200 may be improved.

Although the intensity of the ultraviolet rays irradiated to the photo-reactive polymeric layer may be controlled with a fixed scan velocity of the mask and a fixed irradiating energy of the ultraviolet rays, and by changing a ratio of the opening portion of the mask, the present invention is not limited thereto. Alternatively, the intensity of ultraviolet rays irradiated to the photo-reactive polymeric layer may be controlled by changing the scan velocity of the mask and the irradiating energy of the ultraviolet ray. Accordingly, the shape of the opening portion of the mask may be changed.

Figure 9:
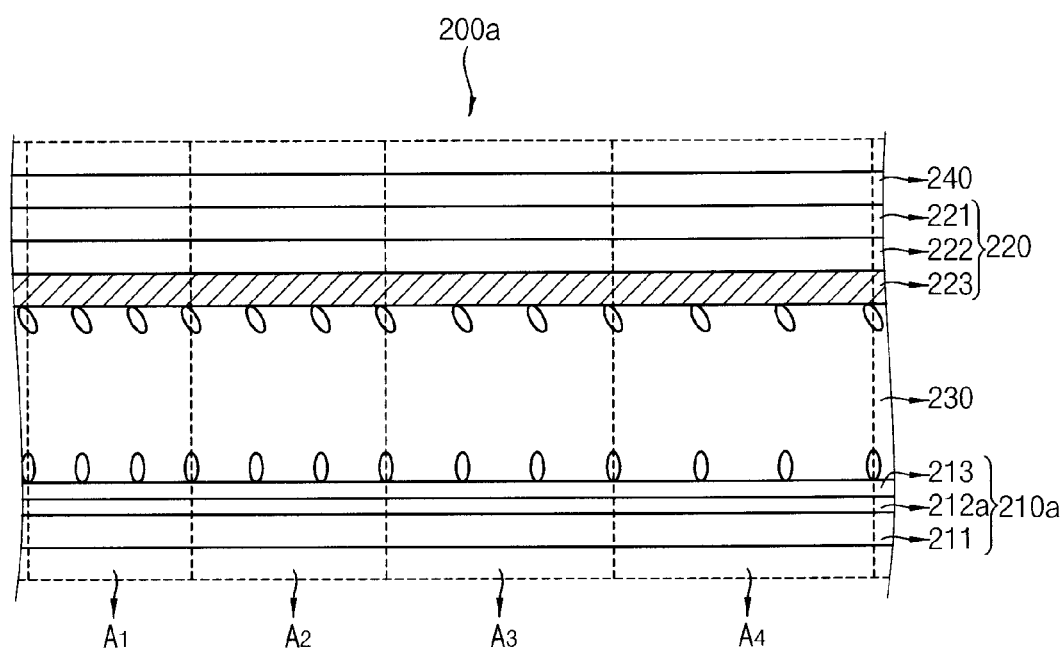
FIG. 9 is a cross-sectional view illustrating a lens panel according to an exemplary embodiment of the present invention.
Figure 10:
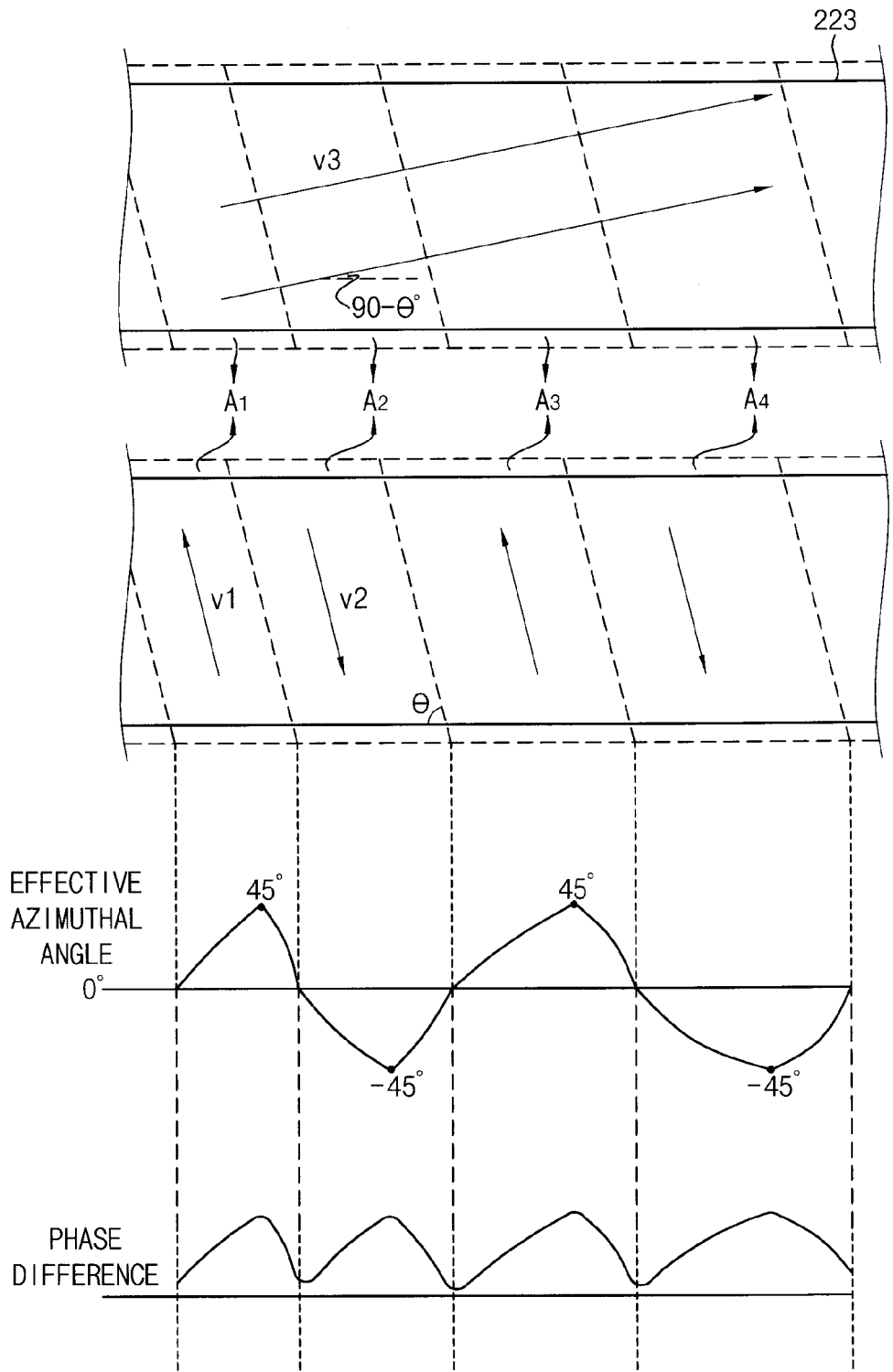
FIG. 10 is a diagram illustrating alignment directions of FIG. 9 and a graph illustrating an effective azimuthal angle and a phase difference according to an exemplary embodiment of the present invention.

FIG. 9 is a cross-sectional view illustrating a lens panel according to an exemplary embodiment of the present invention. FIG. 10 is a diagram illustrating alignment directions of FIG. 9 and a graph illustrating an effective azimuthal angle and a phase difference according to an exemplary embodiment of the present invention.

A lens panel 200a according to an exemplary embodiment is substantially the same as the lens panel 200 explained with reference to FIG. 1, FIG. 2, FIG. 3, FIG. 4, and FIG. 5 except for a first electrode. Thus, the same reference numerals will be used to refer to the same or like parts as those described in the previous exemplary embodiment of FIG. 1, FIG. 2, FIG. 3, FIG. 4, and FIG. 5 and any repetitive explanation concerning the above elements will be omitted.

Referring to FIG. 9 and FIG. 10, the lens panel 200a includes a first substrate 210a, a second substrate 220, and a liquid crystal layer 230.

The first substrate 210a includes a first base substrate 211. A first electrode 212a is disposed on the first base substrate 211. The first electrode 212a is formed on the entire lens area LA of the first base substrate 211 without a patterning process. The first electrode 212a may include a transparent conductive material. For example, the first electrode 212a may include indium tin oxide ("ITO") or indium zinc oxide ("IZO"). The first electrode 212a may include one of ITO, IZO, or a mixture of ITO and IZO. The first electrode 212a is formed without a patterning process so that a single voltage may be applied to the first electrode 212a corresponding to an entire area of the lens panel 200.

A first alignment layer 213 is disposed on the first base substrate 211 on which the first electrode 212a is disposed. The first alignment layer 213 may include a plurality of alignment areas A1, A2, A3, A4, ..., An as explained with reference to FIG. 1, FIG. 2, FIG. 3, FIG. 4, and FIG. 5. The adjacent alignment areas are aligned to have alignment directions opposite to each other. For example, if a first alignment area A1 is aligned with the positive direction of the third direction D3, a second alignment area A2 adjacent to the first alignment area A1 is aligned with the negative direction of the third direction D3.

According to an exemplary embodiment, the first electrode 212a is formed on the entire lens panel 200a without a patterning process and the first alignment layer 213 is divided into the plurality of alignment areas having opposite azimuthal angles such that the lens panel 200a may be controlled to function as a Fresnel lens by adjusting an azimuthal angle of the alignment layer without electrodes having micro pitch patterns. Thus, a load for fabricating the micro pitch patterns may be decreased, and a reliability of the lens panel 200a may be improved.

A single voltage is applied to the first electrode 212a so that the single voltage may be directly applied to the first electrode 212a without using an additional data driver for the lens panel 200a. Thus, the structure of a lens panel driver may be simplified, and the manufacturing cost may be decreased.

A method of manufacturing the lens panel 200a according to the present exemplary embodiment is substantially the same as the method of manufacturing the lens panel 200 according to the exemplary embodiment explained with reference to FIG. 6, FIG. 7, and FIG. 8 except that a process of patterning the first electrode 212a is omitted. Thus, any repetitive explanation concerning the above elements will be omitted.

Figure 11:
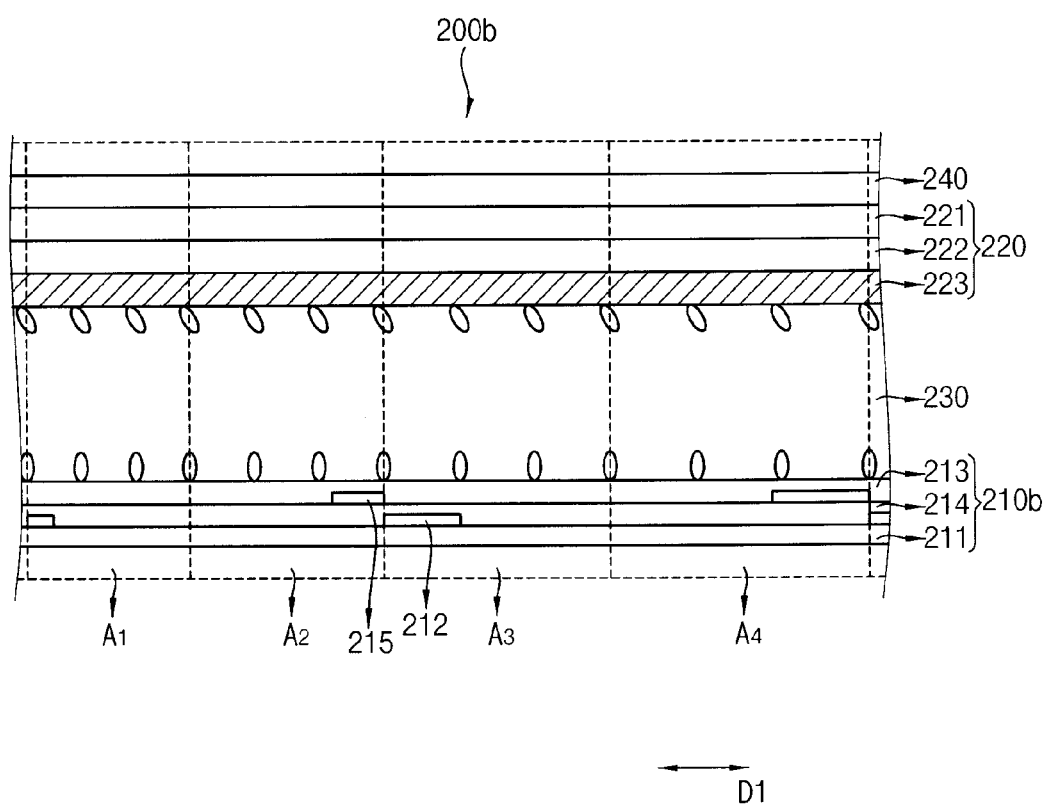
FIG. 11 is a cross-sectional view illustrating a lens panel according to an exemplary embodiment of the present invention.

FIG. 11 is a cross-sectional view illustrating a lens panel according to an exemplary embodiment of the present invention.

The lens panel 200b according to an exemplary embodiment is substantially the same as the lens panel 200 explained with reference to FIG. 1, FIG. 2, FIG. 3, FIG. 4, and FIG. 5 except for a first substrate. Thus, the same reference numerals will be used to refer to the same or like parts as those described in the exemplary embodiment of FIG. 1, FIG. 2, FIG. 3, FIG. 4, and FIG. 5 and any repetitive explanation concerning the above elements will be omitted.

Referring to FIG. 11, the lens panel 200b includes a first substrate 210b, a second substrate 220, and a liquid crystal layer 230.

The first substrate 210b includes a first base substrate 211. A plurality of first electrodes 212 is disposed on the first base substrate 211. The first electrode 212 may include a transparent conductive material. For example, the first electrode 212 may include indium tin oxide ("ITO") or indium zinc oxide ("IZO"). The first electrode 212 may include one of ITO, IZO, or a mixture of ITO and IZO.

The first electrode 212 may have a substantially bar shape disposed parallel with the unit lens LU. The first electrodes 212 are disposed on the first base substrate 211 spaced apart from each other. The widths of the first electrodes 212 may increase as the first electrodes 212 get closer to the central portion of the unit lens LU. The widths of the first electrodes 212 may be symmetrical with respect to the central portion of the unit lens LU.

An insulating layer 214 may be disposed on the first base substrate 211 on which the first electrode 212 is disposed. The insulating layer 214 may include an insulating material which transmits light. The insulating layer 214 may include a silicon nitride, SiNx, or a silicon oxide, SiOx.

A plurality of third electrodes 215 is disposed on the first base substrate 211 on which the insulating layer 214 is disposed. The third electrode 215 may include a transparent conductive material. The third electrode 215 may have a shape substantially the same as the first electrode 212.

The first electrode 212 and the third electrode 215 may be alternately disposed in the alignment areas A1, A2, A3, A4, ..., An For example, the first electrodes 212 may be disposed adjacent to a boundary in the negative direction of the first direction D1 of the odd numbered alignment areas A1, A3, ..., etc. The third electrodes 215 may be disposed adjacent to a boundary in the positive direction of the first direction D1 of the even numbered alignment areas A2, A4, ..., etc. Thus, the first electrodes 212 may not overlap with the third electrodes 215.

Different voltages are applied to the first electrode 212 and the third electrode 215. If a first voltage is applied to the first electrodes 212, a third voltage which is different from the first voltage is applied to the third electrodes 215. For example, the third voltage may be larger than the first voltage.

The voltages applied to the first electrode 212 and the third electrode 215 which are adjacent to each other may be dramatically changed so that the liquid crystal molecules disposed on the first electrode 212 and the third electrode 215 may have phase differences such as the vertical portions H1, H2, H3, H4, . . . , Hn of the refractive portions Z1, Z2, Z3, Z4, . . . , Zn A first alignment layer 213 is disposed on the first base substrate 211 on which the third electrode 215 is disposed. The first alignment layer 213 may include a plurality of alignment areas A1, A2, A3, A4, . . . , An as explained with reference to FIG. 1, FIG. 2, FIG. 3, FIG. 4, and FIG. 5. Adjacent alignment areas are aligned to have alignment directions opposite to each other. For example, if a first alignment area A1 is aligned with the positive direction of the third direction D3, a second alignment area A2 adjacent to the first alignment area A1 is aligned with the negative direction of the third direction D3.

According to an exemplary embodiment, the voltages applied to the first electrode 212 and the third electrode 215 which are adjacent to each other are dramatically changed so that the phase differences dramatically change at boundaries of the alignment areas A1, A2, A3, A4, . . . , An so that the lens panel 200b may represent a phase difference characteristic such as the vertical portions H1, H2, H3, H4, . . . , Hn of the Fresnel lens.

In addition, the lens panel 200b may be controlled to function as a Fresnel lens by adjusting an azimuthal angle of the alignment layer without electrodes having micro pitch patterns. Thus, a load for fabricating the micro pitch patterns may be decreased, and a reliability of the lens panel 200b may be improved.

A method of manufacturing the lens panel 200b according to the present exemplary embodiment is substantially the same as the method of manufacturing the lens panel 200 explained with reference to FIG. 6, FIG. 7, and FIG. 8 except for forming the insulating layer 214 and forming the third electrode 215 substantially the same as forming the first electrode 212. Thus, any repetitive explanation concerning the above elements will be omitted.

Figure 12:
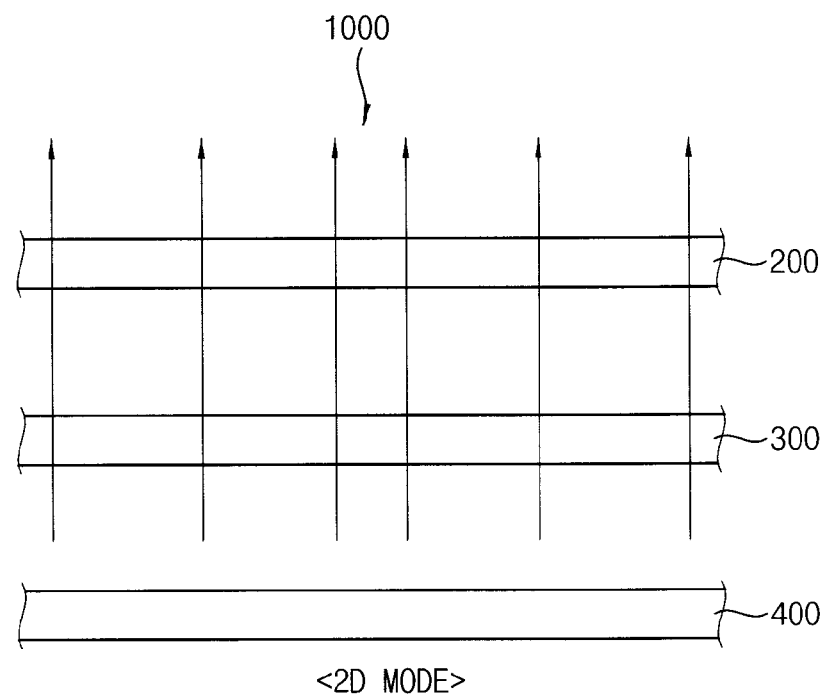
FIG. 12 is a diagram illustrating the display of a two-dimensional image according to an exemplary embodiment of the present invention.

FIG. 12 is a diagram illustrating the display of a two-dimensional image according to an exemplary embodiment of the present invention. FIG. 12 is a conceptual diagram illustrating displaying the 2D image using the display apparatus 1000 of FIG. 1.

Referring to FIG. 1 and FIG. 12, the light source module 400 generates light.

The light generated by the light source module 400 is provided to the panel module 300. The panel module 300 displays the 2D image.

The light from the panel module 300 is provided to the lens panel 200. In 2D mode, voltages are not applied to the lens panel 200 so that the liquid crystal molecules maintain an initially aligned state. The light from the panel module 300 is not refracted; rather the light is fully transmitted to the lens panel 200.

Thus, the display apparatus 1000 displays a 2D image.

Figure 13:
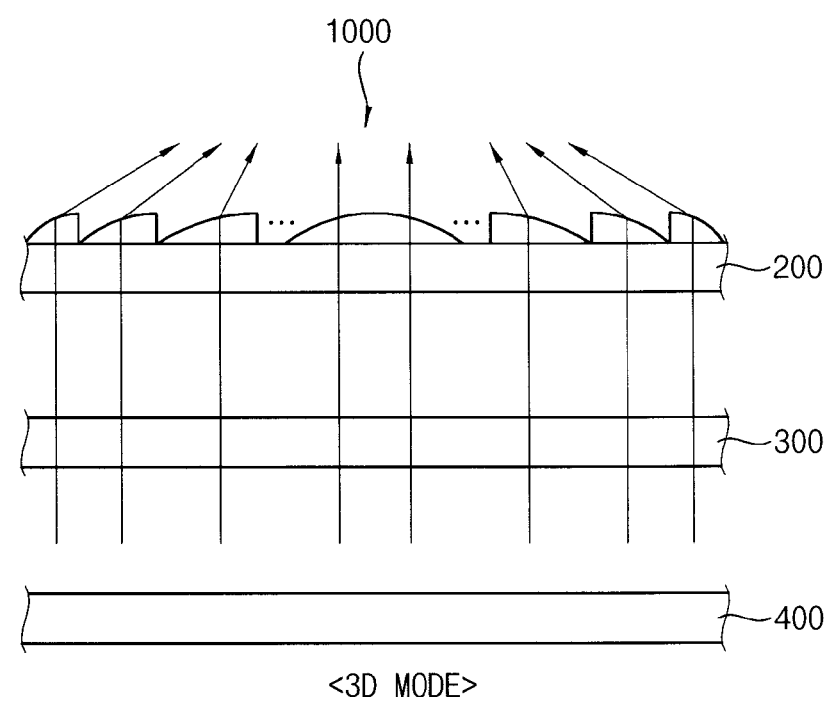
FIG. 13 is a diagram illustrating the display of a three-dimensional image according to an exemplary embodiment of the present invention.

FIG. 13 is a diagram illustrating the display of a three-dimensional image according to an exemplary embodiment of the present invention. FIG. 13 is a conceptual diagram illustrating displaying a 3D image using the display apparatus 1000 of FIG. 1.

Referring to FIG. 1 and FIG. 13, the light source module 400 generates light.

The light generated by the light source module 400 is provided to the panel module 300. The panel module 300 displays the 3D image.

The light from the panel module 300 is provided to the lens panel 200. In the 3D mode, a first voltage and a second voltage are applied to the first electrode 212 and the second electrode 222 of the lens panel 200.

According to the first voltage and the second voltage, the liquid crystal molecules are rearranged to form multiple unit lenses LU. Each of the multiple unit lenses LU functions as a Fresnel lens. Thus, the light from the panel module 300 is refracted by the lens panel 200, which is a liquid crystal lens panel.

Thus, the display apparatus 1000 displays the 3D image.

According to an exemplary embodiment, the unit lens LU is driven as the Fresnel lens, which has a plurality of the arc portions, such that a cell gap of the lens panel 200 may be decreased. Thus, the effectiveness of manufacturing the lens panel 200 may be improved, and a manufacturing cost of the lens panel 200 may be decreased.

In addition, the lens panel 200 may be controlled to function as a Fresnel lens by adjusting an azimuthal angle of the alignment layer without electrodes having micro pitch patterns. Thus, a load for fabricating the micro pitch patterns may be decreased, and a reliability of the lens panel 200 may be improved.

In addition, a single voltage is applied to the first electrode 212 so that the single voltage may be directly applied to the first electrode 212 without using an additional data driver for the lens panel 200. Thus, the structure of a lens panel driver may be simplified, and the manufacturing cost may be decreased.

As explained above, the display apparatus according to the present invention controls the lens panel to function as a Fresnel lens so that a cell gap of the lens panel may be decreased and a response time may be decreased.

According to the exemplary embodiments of the present invention, the lens panel may be controlled to function as a Fresnel lens by adjusting an azimuthal angle of an alignment layer without electrodes having micro pitch patterns. Thus, a load for fabricating the micro pitch patterns may be decreased, and a reliability of the lens panel may be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A lens panel comprising:
 a first substrate comprising a first base substrate, first electrodes disposed on the first base substrate and spaced apart from each other along a first direction, and a first alignment layer disposed on the first electrodes, the first alignment layer comprising a unit lens area, the unit lens area comprising a plurality of first alignment areas having a first alignment direction and a plurality of second alignment areas having a second alignment direction different from the first alignment direction;
 a second substrate comprising a second base substrate, a second electrode disposed on the second base substrate, and a second alignment layer disposed on the second electrode and having a third alignment direction; and
 a liquid crystal layer disposed between the first substrate and the second substrate, wherein:
the first and second alignment areas are alternately disposed with each other in the unit lens area along the first direction such that at least a boundary between the first alignment area and the second alignment area corresponds to a gap between adjacent first electrodes; and
the third alignment direction crosses the first and second alignment directions.

2. The lens panel of claim 1, wherein the first alignment direction is opposite to the second alignment direction.

3. The lens panel of claim 1, wherein the third alignment direction is substantially perpendicular to the first alignment direction and the second alignment direction.

4. The lens panel of claim 1, wherein the first alignment direction and the second alignment direction are symmetrical along the third alignment direction.

5. The lens panel of claim 4, wherein widths of the first alignment area and the second alignment area increase as the first alignment area and the second alignment area get closer to a central portion of the unit lens area.

6. The lens panel of claim 1, wherein boundaries between the first and second alignment areas alternately correspond to the first electrodes and the gap between the first electrodes.

7. The lens panel of claim 1, further comprising:
an insulating layer covering the first electrodes; and
third electrodes disposed on the insulating layer,
wherein each of the first electrodes and the third electrodes has a substantially bar shape, and
each of the first electrodes is disposed in the first alignment area, and each of the third electrodes is disposed in the second alignment area.

8. The lens panel of claim 7, wherein the third electrodes are configured to receive a first voltage, the first electrodes are configured to receive a second voltage, and a magnitude of the first voltage exceeds a magnitude of the second voltage.

9. The lens panel of claim 1, wherein widths of the first electrodes differ from one another.

10. A display apparatus comprising:
a panel module to display a two-dimensional image or a three-dimensional image;
a lens panel comprising:
a first substrate comprising a first base substrate, first electrodes disposed on the first base substrate and spaced apart from each other along a first direction, and a first alignment layer disposed on the first electrodes, the first alignment layer comprising a unit lens area, the unit lens area comprising a first alignment area having a first alignment direction and a second alignment area having a second alignment direction different from the first alignment direction;
a second substrate comprising a second base substrate, a second electrode disposed on the second base substrate, and a second alignment layer disposed on the second electrode and having a third alignment direction, the third alignment direction being substantially perpendicular to the first alignment direction and the second alignment direction; and
a liquid crystal layer disposed between the first substrate and the second substrate; and
a light source module disposed under the panel module, and the light source module to provide light to the panel module,
wherein the first and second alignment areas are alternately disposed with each other in the unit lens area along the first direction such that at least a boundary between the first alignment area and the second alignment area corresponds to a gap between adjacent first electrodes.

* * * * *